United States Patent [19]

Bitter

[11] Patent Number: 4,670,151

[45] Date of Patent: Jun. 2, 1987

[54] PROCESS FOR THE SEPARATION OF AN ORGANIC LIQUID MIXTURE

[75] Inventor: Johan G. A. Bitter, Amsterdam, Netherlands

[73] Assignee: Shell Oil Company, Houston, Tex.

[21] Appl. No.: 700,074

[22] Filed: Feb. 11, 1985

Related U.S. Application Data

[63] Continuation of Ser. No. 471,103, Mar. 1, 1983, abandoned.

[30] Foreign Application Priority Data

Mar. 4, 1982 [NL] Netherlands .................. 8200881

[51] Int. Cl.⁴ .............................................. B01D 31/00
[52] U.S. Cl. .................................... 210/641; 210/648
[58] Field of Search ............... 208/317, 321, 339, 322, 208/309; 210/644, 648, 641

[56] References Cited

U.S. PATENT DOCUMENTS

| | | | |
|---|---|---|---|
| 3,305,595 | 2/1967 | Paulson | 208/309 X |
| 3,556,991 | 1/1971 | Gerhold | 208/321 |
| 4,478,719 | 10/1984 | Michele et al. | 210/641 |

*Primary Examiner*—Frank Spear

[57] ABSTRACT

A process for the separation of a two component liquid mixture is described in which the liquid mixture is passed along one side of a membrane and an extracting agent is passed on the other side of the membrane, the process being characterized by the use of a membrane impermeable to at least one component of the liquid mixture and permeable to the extracting agent.

50 Claims, 3 Drawing Figures

PROCESS FOR THE SEPARATION OF AN ORGANIC LIQUID MIXTURE

This is a continuation of application Ser. No. 471,103, filed Mar. 1, 1983 now abandoned.

BACKGROUND OF THE INVENTION

The invention relates to an improved process for the separation of a liquid mixture of two components by contacting the mixture with an extracting agent in which one component is soluble and the other component is insoluble or substantially insoluble, subsequently separating the second component from the extracting agent which contains the dissolved component and finally separating the dissolved component from the extracting agent.

The process called extraction is well known, particularly for the separation of a mixture of two liquids. The insoluble component is called the raffinate, and the dissolved component is designated the extract. However, mixtures of a liquid and a solid material may also be separated in this way. The extracting agent is sometimes referred to as solvent, in particular when a single solid and a single liquid component are involved. Naturally, the mixture may comprise more than two materials, but, according to the present process, it is divided into two components.

One drawback of extraction processes is the necessity of expenditure of large amounts of energy in the separation of the second component from the extracting agent. For example, if distillation is employed for the separation, large quantities of heat must be used. It is the object of the invention to reduce the cost of this separation.

SUMMARY OF THE INVENTION

Accordingly, the invention relates to a process for the separation of a liquid mixture of first and second components (A and B) by contacting the mixture with an extracting agent in which the second component (B) is soluble and the first component (A) is insoluble or substantially insoluble, subsequently separating the first component (A) from the extracting agent containing the dissolved second component (B), and finally separating the second component (B) from the extracting agent, the process being characterized in that a stream of the mixture of the first and second components (A and B) is passed along one side of a membrane, while a previously formed stream of the extracting agent containing the dissolved second component (B) is passed along the other side of the membrane, with the membrane being substantially permeable to the extracting agent but non-permeable to the first component (A), after which the mixture of the first and second components (A) and (B), which has taken up the extracting agent at least partly, is passed to a separator in which the first component (A) is separated from the extracting agent containing the dissolved second component (B), thus forming the stream that is passed along the other side of the membrane. For simplicity hereinafter, the first and second components will be designated as A and B, respectively, and, as indicated, the components may comprise mixtures themselves.

In itself, the use of membranes is known, for instance in dialysis processes. However, in the known membrane processes, some component or impurity or other migrates through the membrane, whereas in the present invention, the solvent or extracting agent migrates through the membrane. In the case of a membrane along both sides of which a flow can be maintained, a liquid to be purified may be present on one side and a sweep liquid on the other side. In addition, the known membrane processes have been put to use almost exclusively in inorganic chemistry, for instance in the desalination of seawater, but the invention is particularly, though not exclusively, suitable for use in organic processes. The invention is particularly suited for extraction processes used in the petroleum industry for the separation of hydrocarbon mixtures.

The invention, therefore, relates particularly to a process for the extraction of a hydrocarbon mixture by contacting it with an extracting agent, as described herein.

Examples of such hydrocarbon extractions are given in the following Table.

TABLE A

| Name of Process | Mixture | Component A | Component B | Extracting Agent |
| --- | --- | --- | --- | --- |
| 1. deasphalting | vacuum residue | asphaltic bitumen | deasphalted oil | propane, butane |
| 2. furfural extraction | (deasphalted) residual oil, spindle oil, heavy cycle oil | furfural raffinate | furfural extract (lub oil) | furfural |
| 3. phenol extraction | (deasphalted) residual oil, spindle oil, heavy cycle oil | phenol raffinate | phenol extract | phenol |
| 4. $SO_2$ extraction | (deasphalted) residual oil spindle oil heavy cycle oil | $SO_2$ raffinate | $SO_2$ extract | liquid $SO_2$ |
| 5. edeleanu extraction | (unrefined) kerosine fraction | (refined) kerosine | kerex (aromatics) | liquid $SO_2$ |
| 6. edeleanu extraction | (unrefined) gasoline fraction | $SO_2$ raffinate | superbenzex (aromatics) | liquid $SO_2$ |
| 7. sulfolane extraction | platformate | sulfolane raffinate | aromatic extract | sulfolane |
| 8. glycol extraction | platformate | glycol raffinate | aromatic extract | diethylene glycol |
| 9. dewaxing | waxy lubricating oil | paraffinic wax | dewaxed oil | methylethyl ketone, propane |
| 10. urea dewaxing | heavy gas oil, | n-paraffin | dewaxed | dichloromethane |

TABLE A-continued

| Name of Process | Mixture | Component A | Component B | Extracting Agent |
| --- | --- | --- | --- | --- |
| | fuel oil | wax/urea adduct | oil | |

Processes 9 and 10 of Table A relate to liquid-solid separations, the other processes are liquid-liquid extractions. Asphaltic bitumen (process 1) may at times be very tough, yet from a physical point of view it is a liquid.

As indicated, the invention has the advantage that the extracting agent, which previously had to be separated from component B in a cumbersome and costly manner (for instance through distillation, crystallization or stripping) and subsequently reintroduced into the mixture to be separated, is now transferred in a simple way from component B, which has already been separated, to the mixture that has yet to be treated. Separation and reintroduction can be carried out at the same temperature and pressure, which means an important saving in energy cost.

Depending on the conditions used, a larger or a smaller portion of the total quantity of extracting agent will be transferred through the membrane. Therefore, there will be certain cases in which one more final separation will be carried out, but this separation will always be carried out on a smaller scale and will therefore be less expensive than a process which is not preceded by the removal of extracting agent through a membrane.

If the separator in which component A is separated from the stream of extracting agent and component B is not quite perfect, viz., if, upon leaving the separator, component A is still mixed with a (small) quantity of extracting agent, then a final separation of extracting agent and component A should still be carried out. In the processes used up till now that separation was usually carried out by distillation, crystallization or stripping, but also in these processes a membrane along both sides of which a flow can be maintained may be used, if desired, and thus the extracting agent may be transferred at least partly to the mixture to be separated. In this case the membrane to be used should be substantially impermeable to component B. However, in view of the relatively small quantities of extracting agent which in actual practice are generally yielded by component A, the saving achieved will be less here.

The membrane is substantially permeable to the extracting agent and impermeable to component A. In one embodiment of the invention, the membrane is also substantially permeable to component B, which is advantageous when the concentration of component B is higher in the mixture of components A and B than in the stream containing the extracting agent. In that case the existing concentration gradient allows component B to diffuse from one side of the membrane to the other, which is just what is aimed at, viz. separation of components A and B. But if the concentration of component B in the stream containing the extracting agent is higher and the membrane is permeable to component B, care should be taken that this concentration is reduced, for instance by the addition of extracting agent. The latter, in other words, means a higher "solvent ratio".

It is known that in membrane processes of the type according to the invention, concentration polarization may arise. As a consequence, in the present process, where the extracting agent diffuses from the "other side" to the "one side" of the membrane, a layer almost exclusively consisting of component B may form along the "other side" of the membrane and, similarly, a layer almost exclusively consisting of extracting agent may form along the "one side" of the membrane. Naturally, this local reversal of the concentration gradient has a restraining influence on the diffusion of the extracting agent. In order to prevent such concentration polarization, the streams are preferably pumped rapidly along both sides of the membrane and, in order not to use too large a membrane surface, the streams are recirculated. Thus, as homogeneous a mixture as possible will constantly be present both on one side and on the other side of the membrane. Pumping rates will preferably be so high that a molecule which can diffuse through the membrane will pass along the membrane some 10 to 30 times before diffusing through it.

This means, first, that part of the mixture of components A and B which has taken up the extracting agent at least partly, is preferably recycled and reintroduced into the stream of the mixture of components A and B (upstream of the membrane) and is thus passed along the first or "one" side of the membrane again. An additional advantage is that the mixture of components A and B is prediluted prior to being passed along the membrane. Particularly in the case of highly viscous liquids, such as residual oils, this is an advantage since this improves their pumpability and/or offers the opportunity of lowering the temperature.

Secondly, this means that part of the stream of the extracting agent containing the dissolved component B, which is passed along the other side of the membrane, is preferably recycled and reintroduced into the stream of the extracting agent containing the dissolved component B, and is thus passed along the other side of the membrane again.

Although in a number of cases a single membrane will be sufficient, there are many cases in which, in view of the imperfections of the commercially available units, the use of more than one membrane will be preferred, either for achieving a higher capacity (parallel arrangement), or deeper extraction (series arrangement). In the latter embodiment, a number of membranes are arranged in series, the stream of components A and B which has been passed along the first or "one side" of any of the membranes subsequently being passed along the first or "one side" of the following membrane, if present, and, similarly, the stream of the extracting agent containing the dissolved component B, which has been passed along the "other side" of any of the membranes subsequently being passed along the "other side" of the preceding membrane, if present. Obviously, if no following or preceding membrane is available, the stream is further treated as described hereinbefore on the subject of a single membrane. In other words, then the stream of components A and B is supplied to the separator and the other stream, now consisting almost entirely of pure component B, may optionally be subjected to a final purification treatment (e.g., stripping).

When more than one membrane is used, the number of membranes will be dependent on the type of process, the supply rates per unit time and the size of the membranes, but preferably the number will be 2 to 20, in particular 4 to 10.

The membrane material may be chosen from the materials known for the purpose, such as polyethylene, polypropylene, cellulose acetate, butyl rubber, methyl rubber, silicon rubber, polystyrene, polytetrafluoroethylene and other polymeric materials. The material should be insoluble both in components A and B and in the extracting agent, and it should also be totally or practically impermeable to component A and, on the other hand, permeable to the extracting agent. Fouling of the membrane by solid or viscous elements of the mixture of components A and B need not be feared, for probably owing to the membrane being continuously "rinsed" by diffusing extracting agent, the membrane remains clean in actual practice.

The configuration in which the membrane material is used may be one of the membrane units along both sides of which a flow can be maintained, which in themselves are known, such as the flat sheet or the tubular membrane unit. However, such configurations are not very economical of space and therefore do not achieve a high packing density ($m^2$ membrane/$m^3$ apparatus).

Preference is given to the use of the spirally wound membrane which has been described in the applicant's copending U.S. application, Ser. No. 471,104, now abandoned, entitled Spiral Wound Membrane, filed even date herewith, which application is incorporated herein by reference. The latter membrane combines the advantages, such as pressure resistance, low initial expense and high packing density, of the well-known spirally wound membranes along one side of which a flow can be maintained with the possibility of maintaining a flow on both sides.

DETAILED DESCRIPTION OF THE INVENTION

Figure 1:
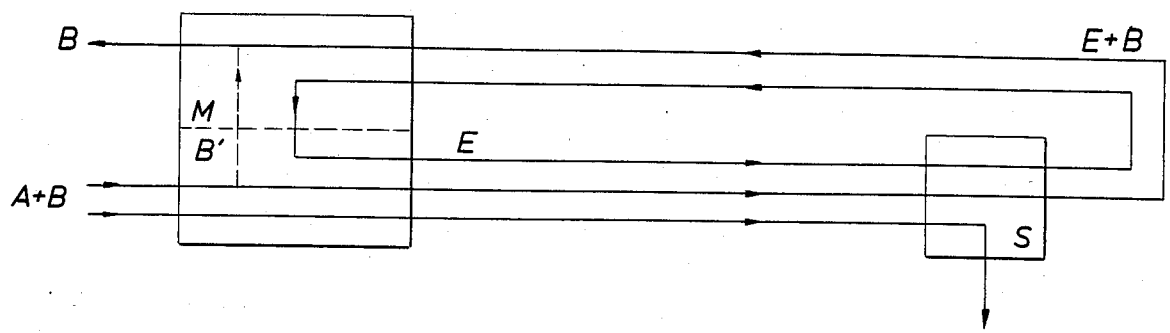

In order to illustrate the invention more fully, reference is made to the accompanying schematic drawing. FIG. 1 represents a general flow diagram of the process according to the invention, and FIGS. 2 and 3 are elaborations thereof representing flow diagrams of a solvent dewaxing unit and a deasphalting unit, respectively.

FIG. 1 schematically indicates the way in which a mixture to be separated (A+B) is fed to a membrane unit (M), where extracting agent (E) joins the stream of the mixture to be separated. The resulting stream is then fed to a separator (S), where component A is separated off. The remainder, i.e., component B and the extracting agent, is recirculated to the membrane unit (M) in order to transfer the extracting agent to a fresh supply of mixture to be separated. If the membrane is permeable to component B and if the concentration of component B is higher in mixture (A+B) than in mixture (E+B), there will also be migration of component B along the membrane in the direction opposite to that of the extracting agent (dashed line B').

Figure 2:
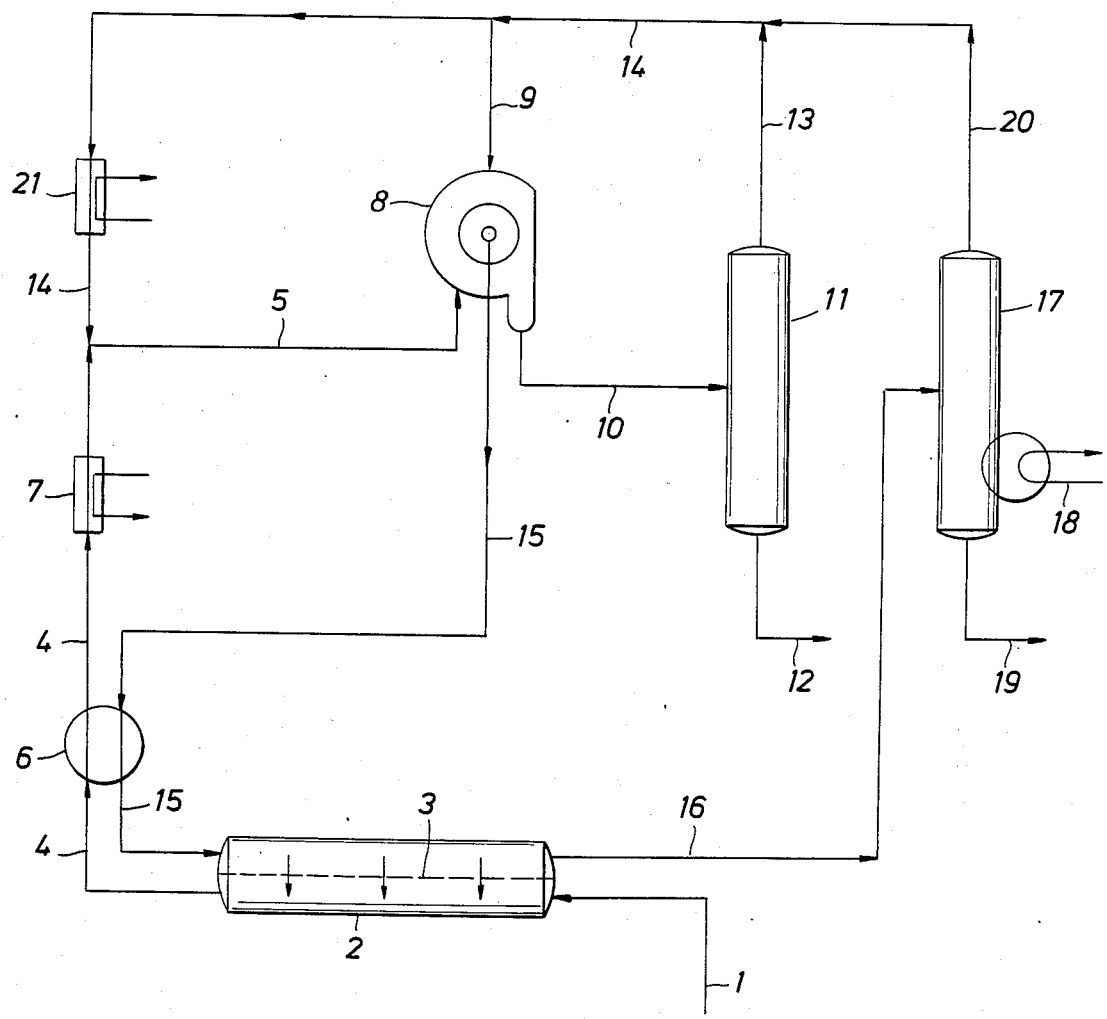

Disregarding many details, FIG. 2 illustrates a flow diagram of a unit for dewaxing with the aid of a solvent, which, according to the invention, includes a membrane unit. The feed, for instance a waxy furfural raffinate, is supplied through line (1) to a membrane unit (2), where dissolvent (extracting agent) joins the feed through membrane (3). As solvent a mixture of aromatics (benzene, toluene, etc.) and methyl ethyl ketone may be used. Through conduits (4) and (5) the feed and the solvent are transferred further via a heat exchanger (6) and a cooler (7), and then to a vacuum rotary drum filter (8). In cooler (7), the feed and the solvent are cooled down to a temperature of about −20° C. in order to allow the paraffins present therein to crystallize. The paraffin crystals are washed on the drum of drum filter (8) using a thin stream of solvent from line (9), subsequently scraped off, and, together with a small quantity of solvent still present, carried off through conduit (10) to a wax-processing unit (11). In unit (11), what is called "slack wax" is separated via line (12) from the solvent, and the solvent is fed through conduit (13) to a recirculation line (14). The filtrate from the vacuum rotary drum filter (8), which consists of dewaxed oil and solvent, is passed through a conduit (15) via heat exchanger (6) and fed to membrane unit (2). Both in heat exchanger (6) and in membrane unit (2) the feedstock is pre-cooled to some extent by its indirect contact with the cold filtrate. After a considerable part of the solvent has diffused through the membrane (3), the dewaxed oil, together with the remainder of the solvent, is fed through conduit (16) to a unit (17) for the processing of dewaxed oil. In reality, unit (17) will generally comprise two flashing columns, one operated at low pressure and temperature, and one at higher pressure and temperature, followed by a steam stripper, in conjunction with distillation columns for the removal of water from the solvent and a number of pumps, burners and reflux pipes, which together have been illustrated as unit (17). The required heat is supplied by a heat exchanger (18). Dewaxed oil is in the end separated via line 19, and the solvent is then passed through conduits (20) and (14), via a cooler (21), and reintroduced into the system, that is to say, the feedstock present in line 5.

Figure 3:
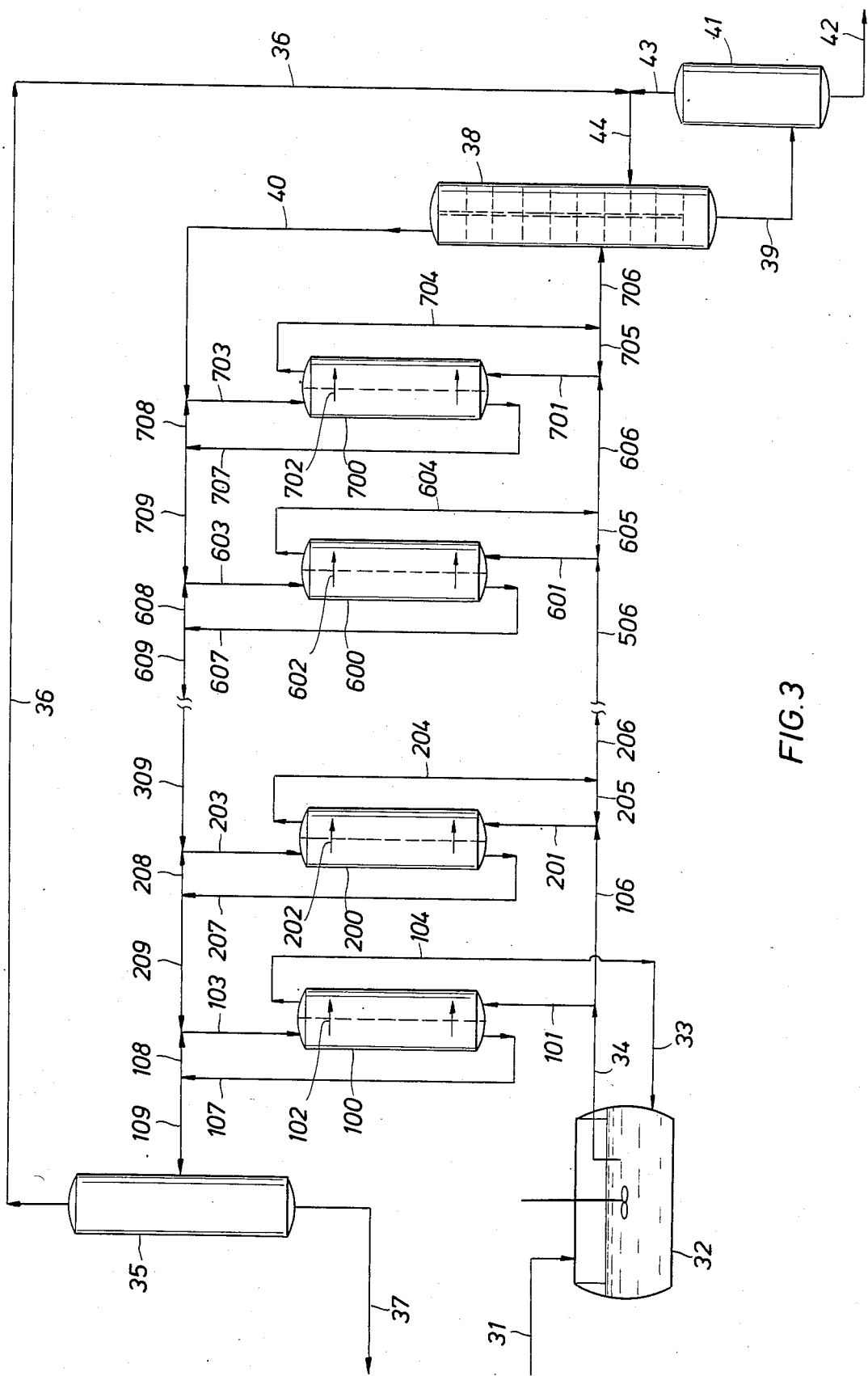

FIG. 3 is an illustration of a flow diagram of a deasphalting unit. For the sake of simplicity, most of the ancillary equipment known in itself and not essential to the invention has been left out of this illustration as well.

More particularly, the feedstock, usually a vacuum residue, is fed through conduit (31) to a mixing vessel (32), where the feed is prediluted with a stream of feed already diluted with extracting agent leaving a conduit (33). Mixing vessel (32) also acts as a buffer vessel so as to eliminate changes in the supply. From mixing vessel (32) there is a continuous discharge, through conduit (34), of a stream part of which is fed, through a conduit (101) to a membrane unit (100) and the remaining part through conduits (106) and (201) to a membrane unit (200). In these membrane units, a certain amount of extracting agent, represented as streams (102) and (202), respectively, diffuses from a stream of deasphalted oil and solvent, supplied via conduits (103) and (203), respectively, through the membrane into the stream of the prediluted feed which has been supplied through conduits (101) and (201), respectively, and is discharged through conduits (104) and (204), respectively. Conduit (104) is connected with conduit (33) which leads to the mixing vessel and conduit (204) recirculates part of the diluted feed to membrane unit (200) through a conduit (205) and conduit (201), while the rest of the diluted feed is fed to a next membrane unit through a conduit (206). The stream of deasphalted oil with extracting agent, which has released part of the extracting agent in membrane units (100) and (200), respectively, is discharged through conduits (107) and (207), respectively. Part of it is recirculated to the original membrane unit through conduits (108) and (103) and (208) and (203), respectively, while the remainder is discharged through conduits (109) and (209), respectively. Conduit (209) is connected with the preceding membrane unit by conduit (103), while conduit (109) is connected with a stripper unit (35), in which the last residues of extracting agent are removed via line 36 from the stream of deasphalted oil (37) with the aid of steam.

The number of membrane units may vary, but in the embodiment described here the number is 7. For convenience, units (300), (400) and (500) have been left out of the figure; only units (100), (200), (600), and (700) have been shown. Corresponding numbers indicate corresponding parts. For instance, conduit (601) corresponds with conduits (201) and (101). The part of the stream of feed with extracting agent which is discharged through conduit (706) is fed to what is called a rotating-disc-contactor (38), where this stream is split up into an asphaltic bitumen fraction which is discharged through a conduit (39) and a fraction of deasphalted oil with extracting agent which is run through a conduit (40) into conduit (703), with the object of removing the solvent in membrane unit (700), and subsequently in units (600), (500), etc. The asphaltic bitumen fraction is freed from remaining extracting agent, if any, in a stripper (41), so that in the end a quantity of asphaltic bitumen can be discharged through conduit (42) and a quantity of extracting agent through conduit (43). Both the streams of conduits (43) and (36) are recirculated through a conduit (44) to the rotating-disc-contactor (38) so as to enable all the extracting agent to be mixed with the feed.

The generation of steam and the subsequent separation of steam and extracting agent (e.g., propane) in stripping unit (35) will require a certain amount of energy which will be greater in proportion as the fraction of extracting agent in the deasphalted oil is larger. According to the invention, this fraction is small, since as much extracting agent as possible is transferred to the fresh feed via membrane units (100), (200) and so on. When a special membrane material, such as polypropylene, is used, there will in addition be a considerable part of deasphalted oil that is transferred direct from streams (101), (201), etc. into streams (107), (207), etc. via membranes (100), (200), etc., which results in additional savings on the overall cost.

Although the transfer of extracting agent illustrated in this figure is countercurrent, this transfer may also take place co-currently.

EXAMPLE

For further elucidation of the process according to the invention, the results will now be given of an experiment in a dewaxing unit as corresponding to that of FIG. 2. Using a polypropylenepolyethylene copolymer membrane of 1 μm in thickness, in the spiralled configuration described in my copending application, almost 74% of the solvent (50% v methyl ethyl ketone, 50% v aromatics) present in stream (15) is transferred from there to stream (4). Table B gives a summary of the effect this has on the processing of the dewaxed oil. All the quantities given are expressed in tons per day (tpd).

TABLE B

| Membrane | Composition | Stream Number | | | | |
|---|---|---|---|---|---|---|
| | | 15 | 3 | 16 | 19 | 20 |
| without | dewaxed oil (tpd) | 299 | — | 299 | 299 | — |
| | solvent (tpd) | 1714 | — | 1714 | — | 1714 |
| with | dewaxed oil (tpd) | 299 | — | 299 | 299 | — |
| | solvent (tpd) | 1714 | 1264 | 450 | — | 450 |

It is clear, that according to the invention, stream (16) contains much less solvent than it does in the embodiment in which no membrane is used and, that, consequently, less solvent need be flashed and stripped in processing unit (17). Therefore, less heat is required for the removal of the solvent from the dewaxed oil (2080 ton cal/h instead of 5220 ton cal/h).

What is claimed is:

1. A process for the separation of an organic liquid mixture comprising first and second components which comprises
    (a) passing a stream of said mixture along a first side of a membrane, while concomitantly passing a stream comprising an extracting agent containing the second of the components of the mixture along the other side of the membrane, the membrane being substantially permeable to the extracting agent, but non-permeable to the first component, the extracting agent passing through said membrane and forming a second mixture containing extracting agent and both components;
    (b) passing at least a portion of the second mixture to a separation zone, and separating first component from the mixture to form a mixture of extracting agent and second component;
    (c) returning the mixture of extracting agent and second component for use in the stream of extracting agent of step (a), and separating second component from the extracting mixture.

2. The process of claim 1 in which the membrane is also substantially permeable to the second component and the concentration of the second component is higher in the liquid mixture of the components than in the stream containing the extracting agent.

3. The process of claim 1 in which at least part of the mixture of the first and second components which has taken up the extracting agent is recycled and reintroduced into the stream of the mixture of first and second components and the resultant stream is passed along the first side of the membrane.

4. The process of claim 2 in which at least part of the stream of the extracting agent containing the dissolved second component which is passed along the other side of the membrane is recycled and reintroduced into the stream of the extracting agent containing the dissolved second component and the resultant stream is passed along the other side of the membrane.

5. The process of claim 3 in which at least part of the stream of the extracting agent containing the dissolved second component which is passed along the other side of the membrane is recycled and reintroduced into the stream of the extracting agent containing the dissolved second component and the resultant stream is passed along the other side of the membrane.

6. The process of any one of claims 1 through 5 in which a number of membranes is arranged in series, the stream of first and second components and extracting agent which has been passed along the first side of any of the membranes is subsequently passed along the first side of the subsequent membrane, if present, and in which the stream of the extracting agent containing the dissolved second component which has been passed along the other side of any of the membranes is subsequently passed along the other side of the preceding membrane, if present.

7. The process of claim 4 in which the second component is soluble or substantially soluble in the extracting agent and the first component is insoluble or substantially insoluble in the extracting agent.

8. The process of claim 7 in which a number of membranes is arrange din series, the stream of first and second components and extracting agent which has been passed along the first side of any of the membranes is subsequently passed along the first side of the subsequent membrane, if present, and in which the stream of the extracting agent containing the dissolved second component which has been passed along the other side of any of the membranes is subsequently passed along the other side of the preceding membrane, if present.

9. A process for the separation of a liquid hydrocarbon mixture comprising first and second components which comprises
(a) passing a stream of said hydrocarbon mixture along a first side of a membrane, while concomitantly passing a stream comprising an extracting agent containing the second of the components of the mixture along the other side of the membrane, the second component being soluble or substantially soluble in the extracting agent, the first component being insoluble or substantially insoluble in the extracting agent, the membrane being substantially permeable to the extracting agent, but nonpermeable to the first component, the extracting agent passing through said membrane and forming a second mixture containing extracting agent and both components;
(b) passing at least a portion of the second mixture to a separation zone, and separating first component from the mixture to form a mixture of extracting agent and second component;
(c) returning the mixture of extracting agent and second component for use in the stream of extracting agent of step (a), and separating second component from the extracting mixture.

10. The process of claim 9 in which the membrane is also substantially permeable to the second ocmponent and the concentration of the second component is higher in the liquid hydrocarbon mixture of the components than in the stream containing the extracting agent.

11. The process of claim 10 in which at least part of the mixture of the first and second components which has taken up the extracting agent is recycled and reintroduced into the stream of the mixture of first and second components and the resultant stream is passed along the first side of the membrane.

12. The process of claim 11 in which at least part of the stream of the extracting agent containing the dissolved second component which is passed along the other side of the membrane is recycled and reintroduced into the stream of the extracting agent containing the dissolved second component and the resultant stream is passed along the other side of the membrane.

13. The process of claim 12 in which at least part of the stream of the extracting agent containing the dissolved second component which is passed along the other side of the membrane is recycled and reintroduced into the stream of the extracting agent containing the dissolved second component and the resultant stream is passed along the other side of the membrane.

14. The process of any one of claim 9 through 13 in which a number of membranes is arranged in series, the stream of first and second components and extracting agent which has been passed along the first side of any of the membranes is subsequently passed along the first side of the subsequent membrane, if present, and in which the stream of the extracting agent containing the dissolved second component which has been passed along the other side of any of the membranes is subsequently passed along the other side of the preceding membrane, if present.

15. The process of claim 2 wherein the liquid mixture is a vacuum residue, the extracting agent is selected from propane and butane, the first component is an asphaltic bitumen, and the second component is a deasphalted oil.

16. The process of claim 2 wherein the liquid mixture is a deasphalted residual oil, the extracting agent is furfural, the first component is furfural raffinate, and the second component is a furfural extract.

17. The process of claim 2 wherein the liquid mixture is a spindle oil, the extracting agent is furfural, the first component is furfural raffinate, and the second component is a furfural extract.

18. The process of claim 2 wherein the liquid mixture is a heavy cycle oil, the extracting agent is furfural, the first component is furfural raffinate, and the second component is a furfural extract.

19. The process of claim 2 wherein the liquid mixture is a deasphalted residual oil, the extracting agent is phenol, the first component is phenol raffinate, and the second component is a phenol extract.

20. The process of claim 2 wherein the liquid mixture is a spindle oil, the extracting agent is phenol, the first component is phenol raffinate, and the second component is a phenol extract.

21. The process of claim 2 wherein the liquid mixture is a heavy cycle oil, the extracting agent is phenol, the first component is phenol raffinate, and the second component is a phenol extract.

22. The process of claim 2 wherein the liquid mixture is a deasphalted residual oil, the extracting agent is liquid $SO_2$, the first component is $SO_2$ raffinate, and the second component is an $SO_2$ extract.

23. The process of claim 2 wherein the liquid mixture is a spindle oil, the extracting agent is liquid $SO_2$, the first component is $SO_2$ raffinate, and the second component is an $SO_2$ extract.

24. The process of claim 2 wherein the liquid mixture is a heavy cycle oil, the extracting agent is liquid $SO_2$, the first component is $SO_2$ raffinate, and the second component is an $SO_2$ extract.

25. The process of claim 2 wherein the liquid mixture is an unrefined kerosine fraction, the extracting agent is liquid $SO_2$, and the first component is refined kerosene.

26. The process of claim 2 wherein the liquid mixture is an unrefined gasoline fraction, the extracting agent is liquid $SO_2$, and the first component is an $SO_2$ raffinate.

27. The process of claim 2 wherein the liquid mixture is platformate, the extracting agent is sulfolane, the first component is a sulfolane raffinate, and the second ocmponent is an aromatic extract.

28. The process of claim 2 wherein the liquid mixture is platformate, the extracting agent is diethylene glycol, the first component is a glycol raffinate, and the second component is an aromatic extract.

29. The process of claim 2 wherein the liquid mixture is a waxy lubricating oil, the extracting agent is selected from methyl ethyl ketone and propane, the first component is a paraffinic wax, and the second component is a dewaxed oil.

30. The process of claim 2 wherein the liquid mixture is a waxy lubricating oil, the extracting agent is propane, the first component is a paraffinic wax, and the second component is a dewaxed oil.

31. The process of claim 2 wherein the liquid mixture is a heavy gas oil, the extracting agent is dichloromethane, the first component is an n-paraffin wax/urea adduct, and the second component is a dewaxed oil.

32. The process of claim 2 wherein the liquid mixture is a fuel oil, the extracting agent is dichloromethane, the first component is an n-paraffin wax/urea adduct, and the second component is a dewaxed oil.

33. The process of claim 10 wherein the liquid hydrocarbon mixture is a vacuum residue, the extracting agent is selected from propane and butane, the first component is an asphaltic bitumen, and the second component is a deasphalted oil.

34. The process of claim 10 wherein the liquid hydrocarbon mixture is a deasphalted residual oil, the extracting agent is furfural, the first component is furfural raffinate, and the second component is a furfural extract.

35. The process of claim 10 wherein the liquid hydrocarbon mixture is a spindle oil, the extracting agent is furfural, the first component is furfural raffinate, and the second component is a furfural extract.

36. The process of claim 10 wherein the liquid hydrocarbon mixture is a heavy cycle oil, the extracting agent is furfural, the first component is furfural raffinate, and the second component is a furfural extract.

37. The process of claim 10 wherein the liquid hydrocarbon mixture is a deasphalted residual oil, the extracting agent is phenol, the first component is phenol raffinate, and the second component is a phenol extract.

38. The process of claim 10 wherein the liquid hydrocarbon mixture is a spindle oil, the extracting agent is phenol, the first component is phenol raffinate, and the second component is a phenol extract.

39. The process of claim 10 wherein the liquid hydrocarbon mixture is a heavy cycle oil, the extracting agent is phenol, the first component is phenol raffinate, and the second component is a phenol extract.

40. The process of claim 10 wherein the liquid hydrocarbon mixture is a deasphalted residual oil, the extracting agent is liquid $SO_2$, the first component is $SO_2$ raffinate, and the second component is an $SO_2$ extract.

41. The process of claim 10 wherein the liquid hydrocarbon mixture is a spindle oil, the extracting agent is liquid $SO_2$, the first component is $SO_2$ raffinate, and the second component is an $SO_2$ extract.

42. The process of claim 10 wherein the liquid hydrocarbon mixture is a heavy cycle oil, the extracting agent is liquid $SO_2$, the first component is $SO_2$ raffinate, and the second component is an $SO_2$ extract.

43. The process of claim 10 wherein the liquid hydrocarbon mixture is an unrefined kerosine fraction, the extracting agent is liquid $SO_2$, and the first component is refined kerosene.

44. The process of claim 10 wherein the liquid hydrocarbon mixture is an unrefined gasoline fraction, the extracting agent is liquid $SO_2$, and the first component is an $SO_2$ raffinate.

45. The process of claim 10 wherein the liquid hydrocarbon mixture is platformate, the extracting agent is sulfolane, the first component is a sulfolane raffinate, and the second component is an aromatic extract.

46. The process of claim 10 wherein the liquid hydrocarbon mixture is platformate, the extracting agent is diethylene glycol, the first component is a glycol raffinate, and the second component is an aromatic extract.

47. The process of claim 10 wherein the liquid hydrocarbon mixture is a waxy lubricating oil, the extracting agent is selected from methyl ethyl ketone and propane, the first component is a paraffinic wax, and the second component is a dewaxed oil.

48. The process of claim 10 wherein the liquid hydrocarbon mixture is a waxy lubricating oil, the extracting agent is propane, the first component is a paraffinic wax, and the second component is a dewaxed oil.

49. The process of claim 10 wherein the liquid hydrocarbon mixture is a heavy gas oil, the extracting agent is dichloromethane, the first component is an n-paraffin wax/urea adduct, and the second component is a dewaxed oil.

50. The process of claim 10 wherein the liquid hydrocarbon mixture is a fuel oil, the extracting agent is dichloromethane, the first component is an n-paraffin wax/urea adduct, and the second component is a dewaxed oil.

* * * * *